H. C. KNOWLES.
BEARING.
APPLICATION FILED FEB. 21, 1916.

1,421,789.

Patented July 4, 1922.

Inventor
Harford Knowles
By
Geo E Kirk
Attorney

UNITED STATES PATENT OFFICE.

HARFORD C. KNOWLES, OF ELMIRA, NEW YORK, ASSIGNOR, BY MESNE ASSIGNMENTS, TO THE WILLYS-MORROW COMPANY, INC., A CORPORATION OF OHIO.

BEARING.

1,421,789.      Specification of Letters Patent.      Patented July 4, 1922.

Application filed February 21, 1916. Serial No. 79,645.

*To all whom it may concern:*

Be it known that I, HARFORD C. KNOWLES, a citizen of the United States of America, residing at Elmira, Chemung County, New York, have invented new and useful Bearings, of which the following is a specification.

This invention relates to anti-friction bearings, and more particularly to annular ball bearings of the radial type.

One of the principal objects of this invention is to provide an improved ball retainer and spacer for properly spacing the balls of an annular ball bearing. A further object of my invention is to provide an improved ball retainer and spacer in which the friction between the balls and the spacing member is reduced to a minimum.

Further objects, and objects relating to economies of manufacture and details of construction, will definitely appear from the detailed description to follow:

A structure constituting a preferred embodiment of my invention is illustrated in the accompanying drawing, forming a part of this specification. My invention is clearly defined and pointed out in the appended claims.

Referring to the drawings.

Figure 1:
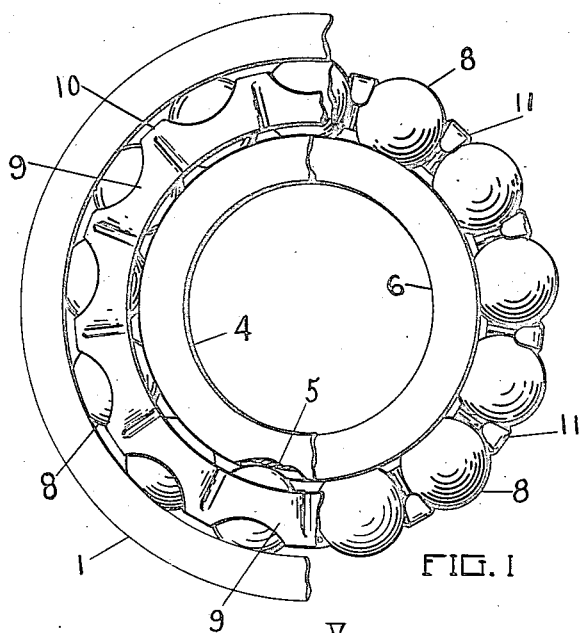
Fig. 1 is a fragmentary view in elevation of a double ring ball bearing of the annular type.
Figure 2:
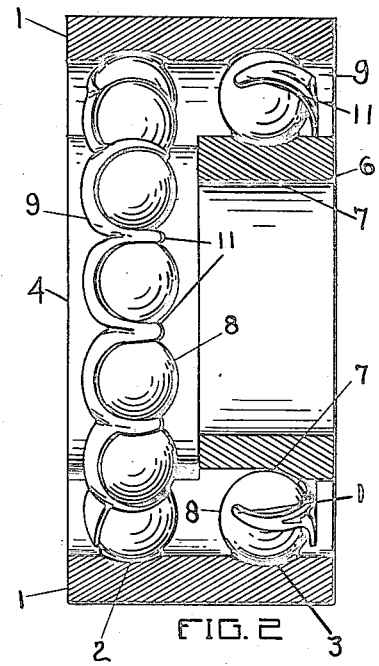
Fig. 2 is a medial section thereof with one of the inner rings in elevation.
Figure 4:
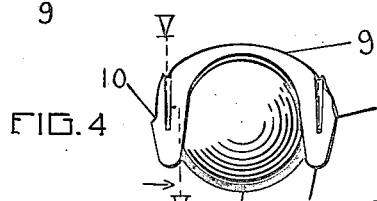
Fig. 4 is a detail view of one of the balls in its normal or central position as to the spacer.
Figure 5:
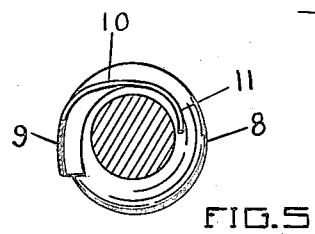
Fig. 5 is a section on the line V—V, Fig. 4, looking in the direction of the arrow.
Figure 3:
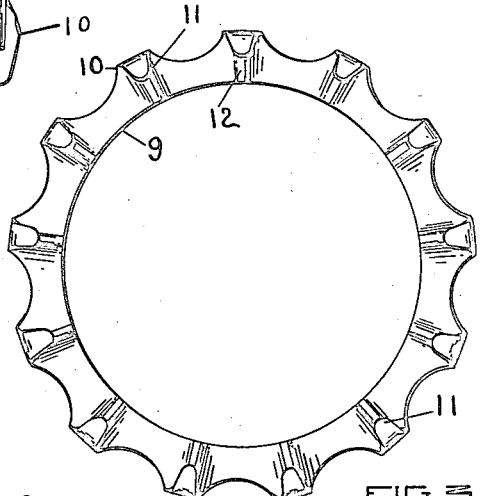
Fig. 3 is a side elevation of a spacer from the inner side.
Figure 6:
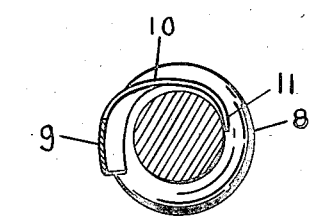
Fig. 6 is a view similar to Fig. 5, but showing the ball crowded up to arm contacting position.
Figure 7:
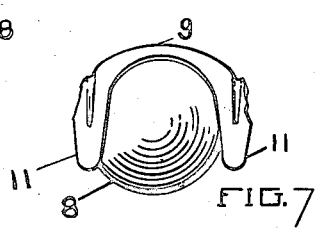
Fig. 7 is a view similar to Fig. 4, with the ball crowded over into contacting form on the other side from the arm than shown in Fig. 6.

The bearing comprises the outer member 1 having the pair of parallel ball ways or grooves 2, 3. Opposing the ball way 2 is the inner bearing member 4 having the groove 5. Adjacent the ring 4 is the second inner bearing ring 6 having ball groove 7 radially opposing the ball groove 3 of the outer ring 1. Disposed between the grooves 2, 5, is the annular series of balls 8, and disposed between the bearing members 1, 6, in the grooves 3, 7, is the second annular series of balls 8.

In order to properly space the balls 8 and to retain them in their uniformly spaced position, I provide a ball retainer or spacer comprising a base ring 9 having a plurality of curved seats separated by radially extending corrugations or ribs 12. These curved seats are curved on a radius greater than that of the balls 8 for a purpose which will hereinafter appear. From the outer end of each of the corrugations or ribs 12 extends a curved hook-shaped resilient finger 10 having a hook-shaped free end 11, said fingers extending in a general direction perpendicular to the base ring 9 so that, when the spacing ring 9 is inserted in position, the fingers 10 extend in a general direction substantially parallel to the axis of the bearing.

When the balls are assembled in position in the endless grooves of the bearing members, the spacing ring 9 may be inserted in position by forcing it axially of the bearing, the resilient fingers 10 yielding sufficiently so as to permit them to pass between the adjacent balls. When the ring 9 is in position, each of the balls 8 contacts with the ring 9 at a single point due to the fact that the curved seats in the ring 9 are curved on a radius greater than that of the balls 8. Furthermore, the dimension of the ring 9 is such that this point of contact between each ball 8 and the ring 9 is at one end of the axis of revolution of the ball in the normal operation of the bearing. As a result, the friction between the ball 8 and the curved seat in the base 9 of the ball retainer is reduced to a minimum. The fingers 10 are curved around the balls and each finger contacts with each of the adjacent balls at a single point, which is near the free end 11 of the finger and at a point such that the friction due to the movement of the ball relative to the spacer is small. It will be seen thus that each of the balls has a three-point contact with the spacing ring and as a result the position of the balls relative to the spacing ring is accurately determined by these three points with a minimum of friction due to the contact between the spacer and the balls.

I have shown my invention embodied in a double row ball bearing, but it will be apparent that it is not limited to a double row ball bearing but may be applied with equal success to a bearing of a single row type. It will further be apparent that it is not limited to the construction of the bearing rings or the grooves for receiving the balls.

I have found that the particular embodiment of my invention, illustrated in the accompanying drawings, is susceptible of considerable variation without departing from the spirit thereof, and, therefore, I desire to claim the same broadly, as well as specifically, as indicated by the appended claims.

What is claimed and it is desired to secure by Letters Patent is:

1. An annular bearing comprising inner and outer rings provided with opposite ball races, balls disposed in said races and an annular spacer provided with prongs extending parallel to the axis of the bearing and having contact with each ball at three points only, one of said points being at one end of the axis of rotation of the ball.

2. An annular bearing comprising inner and outer rings provided with opposed ball races, balls disposed in said races and an annular spacer comprising a base ring contacting with each ball at a single point and fingers extending from one edge of said ring and contacting with each ball at a single point.

3. An annular bearing comprising inner and outer rings provided with opposed ball races, balls disposed in said races and an annular spacer comprising a base ring having a plurality of ball engaging surfaces curved on a radius greater than that of the balls, said ball engaging surfaces being separated by corrugations and yielding fingers extending from the outer edge of said base ring in line with said corrugations and curved upwardly and inwardly and contacting with the adjacent balls at a single point.

4. An annular bearing comprising inner and outer rings provided with opposed ball races, balls disposed in said races and a spacer comprising a base ring bearing against each ball at a point near the axis of revolution thereof and provided with yielding curved fingers extending from one edge of the ring and adapted to yield to permit the seating of the spacer in operative position by a movement axially of the bearing.

5. An annular bearing comprising inner and outer rings provided with opposed ball races, balls disposed in said races, and a spacer comprising a base ring disposed in the space between said inner and outer rings and having yielding curved fingers extending from one edge of the ring in a general direction perpendicular to said ring and adapted to yield to permit the seating of the spacer in operative position by a movement axially of the bearing with said fingers embracing said balls and each finger contacting with each of the adjacent balls at a single point.

6. An annular bearing comprising inner and outer rings provided with opposite ball races, balls disposed in said races and an annular spacer having a base ring contacting with each of said balls at a single point in line with the axis of the revolution of the corresponding ball and provided with a plurality of fingers projecting from the base ring in a direction approximately parallel to the axis of the bearing, the free extremities of the fingers being yieldable radially of the bearing and each adapted to engage adjacent balls on the side opposite the said ring contact.

In witness whereof I affix my signature.

HARFORD C. KNOWLES.